United States Patent [19]

Nicolaides

[11] 4,375,280

[45] Mar. 1, 1983

[54] FREE WING FLYER

[76] Inventor: John D. Nicolaides, P.O. Box 1676, San Luis Obispo, Calif. 93406

[21] Appl. No.: 796,801

[22] Filed: May 13, 1977

Related U.S. Application Data

[63] Continuation-in-part of Ser. No. 437,969, Jan. 30, 1974, abandoned.

[51] Int. Cl.³ .......................... B64C 3/30; B64C 37/02
[52] U.S. Cl. .......................................... 244/13; 244/5; 244/30; 244/49; 244/DIG. 1; 244/2
[58] Field of Search .................... 244/2, 3, 4, 5, 13, 244/16, 30, 31, 44, 48, 49, 142, 145, DIG. 1, 138, 139, 146, 93

[56] References Cited

U.S. PATENT DOCUMENTS

| | | | |
|---|---|---|---|
| 23,163 | 3/1859 | Gage | 244/31 |
| 1,278,462 | 9/1918 | Harris | 244/48 |
| 2,404,544 | 7/1946 | Stelzer | 244/5 |
| 2,623,712 | 12/1952 | Spratt | 244/48 |
| 2,643,076 | 6/1953 | Hurel | 244/16 |
| 2,963,245 | 12/1960 | Bolton | 244/93 |
| 3,135,483 | 6/1964 | Girard | 244/DIG. 1 |
| 3,258,228 | 6/1966 | Crook | 244/46 |
| 3,285,546 | 11/1966 | Jalbert | 244/DIG. 1 |
| 3,480,238 | 11/1969 | Barish | 244/142 |
| 3,756,546 | 9/1973 | Carson, Jr. et al. | 244/140 |
| 3,796,398 | 3/1974 | Eilertson | 244/139 |

OTHER PUBLICATIONS

Nicodaides et al, "A review of Para-Foil Application", Journal of Aircraft, pp. 423-431, vol. 7, No. 5, Sep.-Oct., 1970.
Nicolai, Penny, "Engine with Wings", Science and Mechanics, Dec. 1973, pp. 74-75, 83-84.
Nicolaides, "Parafoil Powered Flight Performance", Jan. 1972, AD 754907.
Rogallo, "Flexible Wings", Astronautics and Aeronautics, Aug. 1968, pp. 50-54.
Poynter, "Hang Gliding", 1973, First Printing Revised 1976, pp. 9-19 and 190-191.
Worth, R. N., "A Pilot Controllable Parachute Descent System for Manned Mars Landing Vehicles," ALAA 2nd Annual Meet, Jul. 26-29, 1965., Paper 65-385.

Primary Examiner—Galen L. Barefoot

[57] ABSTRACT

A flying device capable of carrying man, which contains a wing, a fuselage, and means such as cables for attaching the wing to the fuselage so that the fuselage is suspended below the wing. The fuselage contains a propulsion unit and normally does not have wings for creating a lifting force as in ordinary aircraft.

7 Claims, 23 Drawing Figures

FREE WING FLYER

This application is a continuation-in-part of my application Ser. No. 437,969 filed on Jan. 30, 1974, now abandoned.

The wing in classical aviation is rigid and is rigidly attached to the fuselage and, thus, the wing rolls, pitches, yaws, surges, swerves and heaves entirely together with the fuselage. As a result, the conventional aircraft and the wing in their entirety respond to all atmospheric disturbances and respond to all pilot and command controls whether intentional or unintentional, whether right or wrong, whether safe or unsafe. Numerous aircraft crashes result from both minor and severe atmospheric disturbances and/or from pilot and control errors resulting from combined perturbations or emergencies in single or multiple degrees of freedom of aircraft motion. In addition, the full rigidity of the wing imposes severe problems in design, in weight, in storage, in utility, in versatility, and in performance.

One of the objectives of this invention is to permit manned or unmanned flights in the air or in water employing a wing itself which is free to roll, yaw, pitch, surge and swerve with respect to the fuselage. Also, the relative pitch and heave positions of the wing may be varied in flight as desired.

Another objective of this invention is to provide a wing itself which can fly with complete safety in any winds or flight disturbances with no control from a pilot or no guidance from a servo system.

Another objective of this invention is to provide a wing itself which may be man or servo controlled which in turn controls the entire flight system.

Another objective of this invention is to allow the fuselage to be controlled in roll, pitch, yaw independent of the wing and to surge, heave, and swerve different from the wing.

Another objective of this invention is to provide a wing whose area, platform, and airfoil section may be changed in flight.

Another objective of this invention is to provide a wing that may be folded, packed or stored in the fuselage or detached and stored independently.

Still another objective of this invention is to allow the fuselage to be launched by rocket, or gun, or air dropped with packed wing and later in flight the wing may be deployed for powered and controlled aircraft or missile flight.

Still another objective of this invention is to provide a flight system where the wing may be flapped like a bird for greater propulsion efficiency.

Still another objective of this invention is to provide a buoyant flight system where the wing may be buoyant or the wing and fuselage may be buoyant thereby providing vertical velocity which in turn will provide horizontal velocity and great aerodynamic lift and special repose propulsion.

Additional objects and advantages of the present invention will become apparent from the following description and accompanying drawings, wherein.

Figure 1:
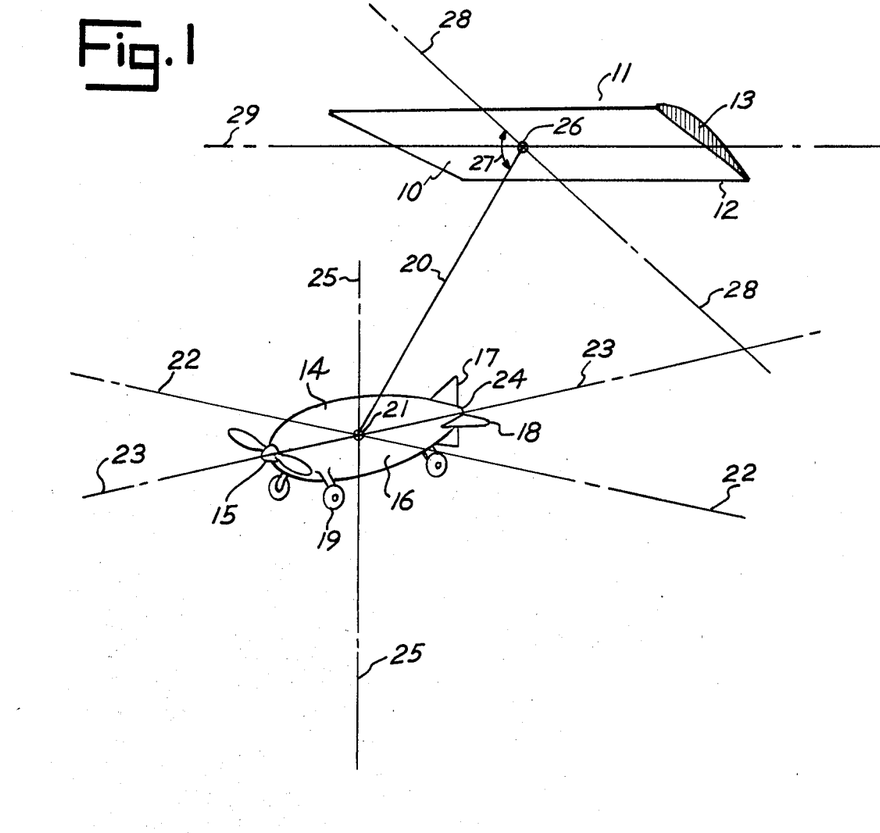
FIG. 1 is a perspective view of the free wing flyer which illustrates the primary features of the present invention.

Referring more specifically to the drawings and to FIG. 1 in particular, numeral 10 indicates a conventional airplane wing which is entirely rigid having a leading edge 11 which may be rounded for subsonic flight and may be sharp for supersonic flight and having a trailing edge 12 which is generally sharp for subsonic flight and blunt for supersonic flight. The wing has thickness 13 and an airfoil section 13 configured for the intended flight regime. Some distance below the wing, normally a distance of about three quarters of a span but may be from one quarter span to over two spans, is the fuselage 14 which contains a propulsion unit 15, compartments for passengers and/or guidance equipment and/or cargo 16. The fuselage may also incorporate vertical stabilizing fins 17 and horizontal stabilizing fins 18. The fuselage also incorporates a landing gear 19 designed for the intended application, be it land, water, or crushable impact as in the case of special missions or planetary landings. Of particular importance and special uniqueness is the mechanical connection 20 between the wing and the fuselage. This connection 20 may be rigid and is attached to the fuselage at 21. The attachment at 21 is such that the fuselage may freely pitch about a horizontal axis 22 and may freely roll about a forward axis 23 which is generally also the line of thrust provided by a propeller in the forward position 15 or in the rear position 24 by a jet in position 24. The fuselage is also free at the attachment 21 to rotate about the vertical axis 25. Therefore, the attachment 21 allows the fuselage complete rotational freedom in pitch, yaw and roll. As a result the fuselage is also able to achieve surging motion along the 23 axis, swerving motions along the 22 axis and heaving motions along the 25 axis, all different from the rotational and translational motions of the wing itself 10. The connection 20 is attached to the wing at 26. Attachment 26 is such that the relative pitch angle 27 between the wing roll axis 28 (chord line) and the connection 20 is a constant. However, attachment 26 is such that the wing may freely roll about axis 28 and the wing may yaw freely about axis 20. Attachment 26 therefore provides freedom for the wing to roll and yaw, but not to pitch, all with respect to connection 20. While the relative pitch angle 27 is generally a constant and fixed, it may be changed in flight so as to provide various wing trim angles of attack and, thus, various values for wing lift coefficient and lift-to-drag ratio may be obtained. It is seen therefore, that due to the nature of the connection 20 attachments at 26 and 21, the wing is able to freely surge along axis 28 and swerve along axis 29. Also, the connection 20 may rotate freely at attachment 21 so as to freely pitch about axis 22, yaw about axis 25, and roll about axis 23.

Figure 2:
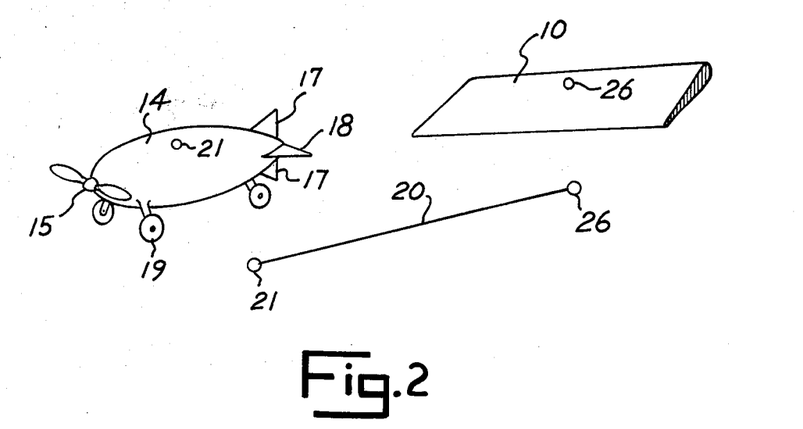
FIG. 2 illustrates the three basic components illustrated in FIG. 1.
Figure 3:
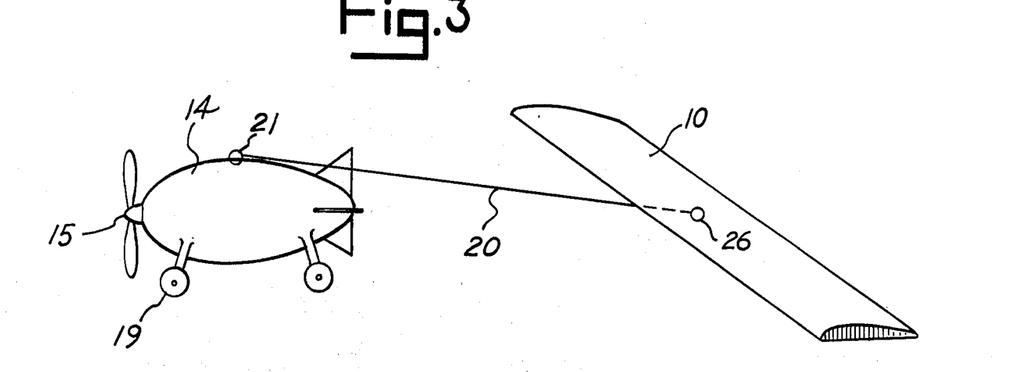
FIG. 3 shows the assembled apparatus of FIG. 1 and FIG. 2 prior to ground launching.
Figure 4:
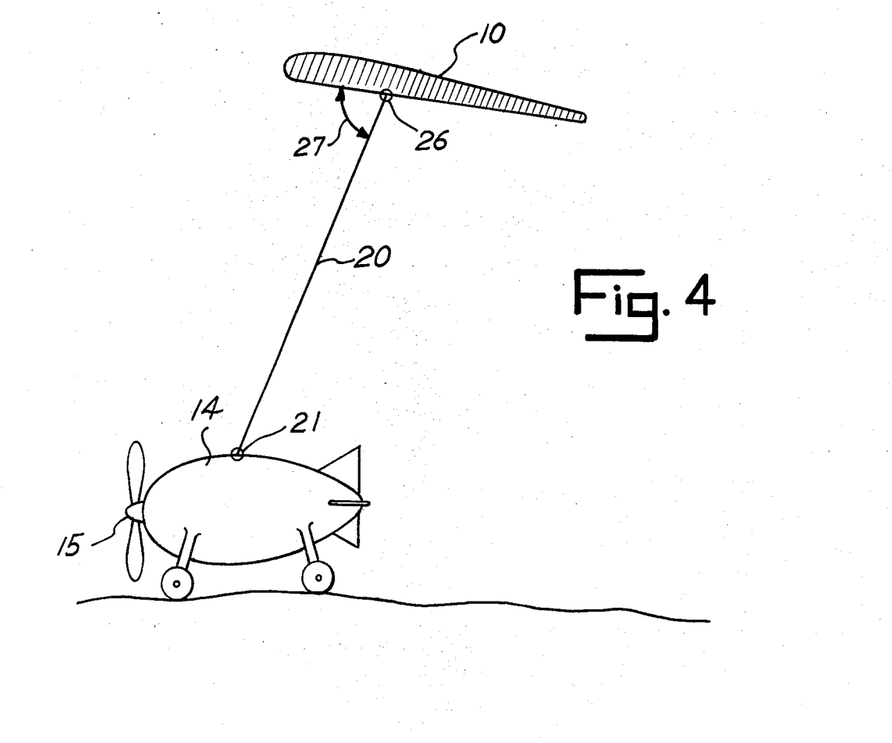
FIG. 4 shows ground launching of the apparatus shown in FIGS. 1, 2 and 3 prior to lift off.
Figure 5:
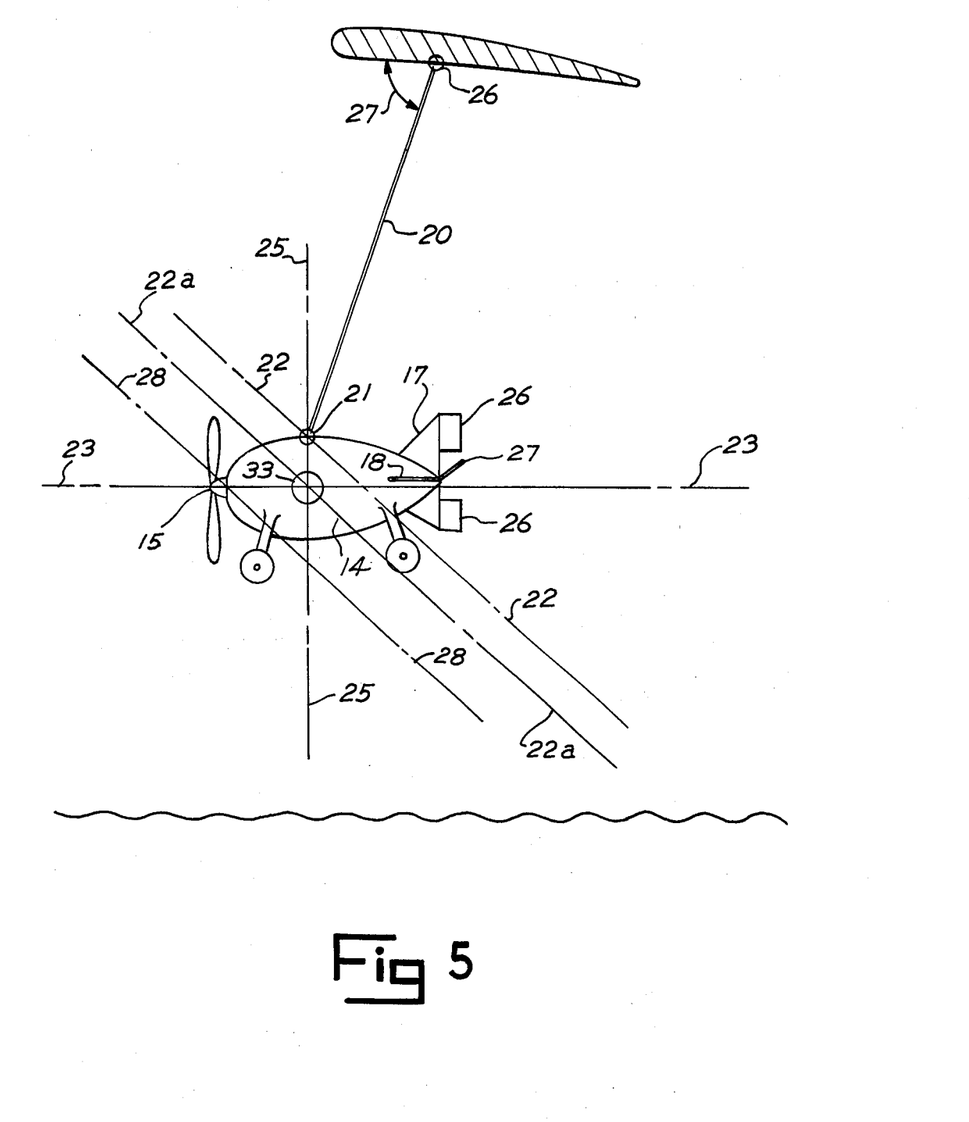
FIG. 5 illustrates the apparatus after take-off and in flight.

The free wing flyer flies as illustrated in FIG. 2, FIG. 3, FIG. 4 and FIG. 5. In FIG. 2 the fuselage 14, the connection 20 and the rigid wing 10 are separate and lying on the ground. The fuselage 14 may thus be driven independently for ground or water transportation. For flight, however, connection 20 is attached to the fuselage at attachment 21 and is attached to the wing at attachment 26 as shown in FIG. 3. By employing the propulsion unit 15, the fuselage is propelled along the ground. As soon as a relative wind is developed wing 10 will rise from the ground and fly like a kite constrained only by connection number 20 as shown in FIG. 4. By the use of aerodynamic techniques such as wash-in, wash-out, dihedral, sweep back, end plates and vertical stabilizing fins, all as required, wing 10 has complete static and dynamic aerodynamic stability and thus is completely stable in flight. The angle of pitch 27 between the wing chordline 28 and the connection member 20 is a constant. By additional propulsion 15 the velocity will increase and the free wing flyer will take-off and fly as shown in FIG. 5. Once in flight the flyer is completely stable and may fly with complete safety in any disturbances of atmosphere, warfare, or accident.

One means of controlling the free wing flyer in flight is to rotate the fuselage about the vertical axis 25 by using rudder 26 (FIG. 5) located on the vertical stabilizing fins 17. In this way the free wing flyer may be turned to the right or to the left. The free wing flyer is able to gain or lose altitude by increasing or decreasing propulsion 15. The flyer may also climb or descend by introducing a fuselage pitch angle. This pitch angle is achieved by rotation about axis 22 which may be produced by movement along axis 23 of the center of gravity 33 of the fuselage, or by deflecting the elevators 27 which are located on the horizontal stabilizing fins 18. Climb and descent may also be achieved by rotating the propulsion system itself about a horizontal axis 28. It is seen, therefore, that the completely free rotation of the fuselage provided by attachment 21 allows the free wing flyer to achieve complete flight control and guidance. Further, by varying the wing pitch angle 27 in flight, a range of flight velocities, rates of climb and rates of sink may be achieved as well as an optimization of overall system flight efficiency. Since both the fuselage and the wing have complete aerodynamic stability in all 12 degrees-of-freedom, any disturbance, whether produced externally by air gusts, storms, etc., or internally by pilot or guidance system inputs, all with stabilize out and yield safe steady state performance. In the event of engine failure the free wing flyer will automatically and purely aerodynamically achieve a completely stable glide. By an instantaneous and controlled increase in the pitch angle 27 upon nearing the ground the flight system is capable of coming almost to a dead stop in the air, thus landing with near zero velocity depending upon the wing loading. Therefore, normal aircraft crashes are avoided.

Figure 6:
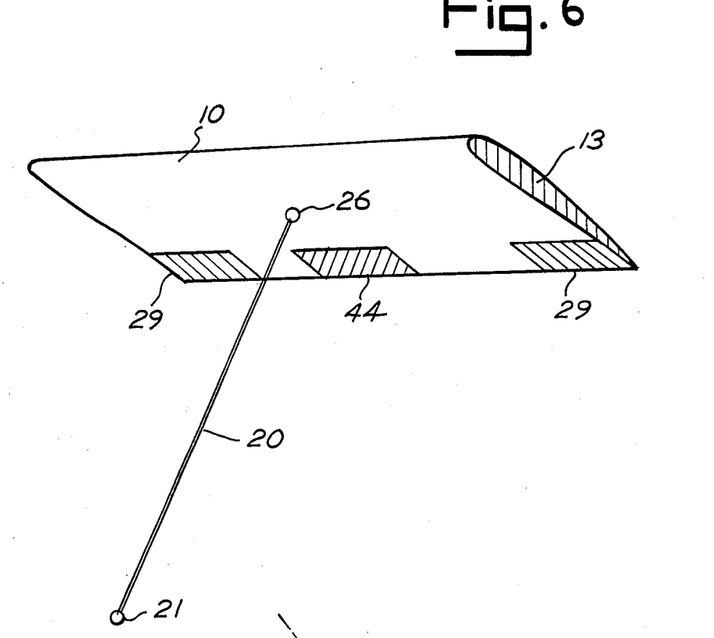
FIG. 6 is a perspective view of the wing which illustrates a manner of control.

The free wing flyer may also be controlled in flight by movement of the wing. For example as shown in FIG. 6, right and left turns may be accomplished by the use of conventional ailerons 29 differentially deflected. Climb and descent may also be accomplished by the use of ailerons 29 both deflected up or both deflected down. The flight velocity of the system may also change by the use of ailerons 29 as shown in FIG. 6 both deflected up or down and coordinated with an increase or decrease in propulsion 15. Therefore, we see that the free wing flyer is able to control and change its flight performance by either control of the fuselage or control of the wing or a combination of both.

Figure 7:
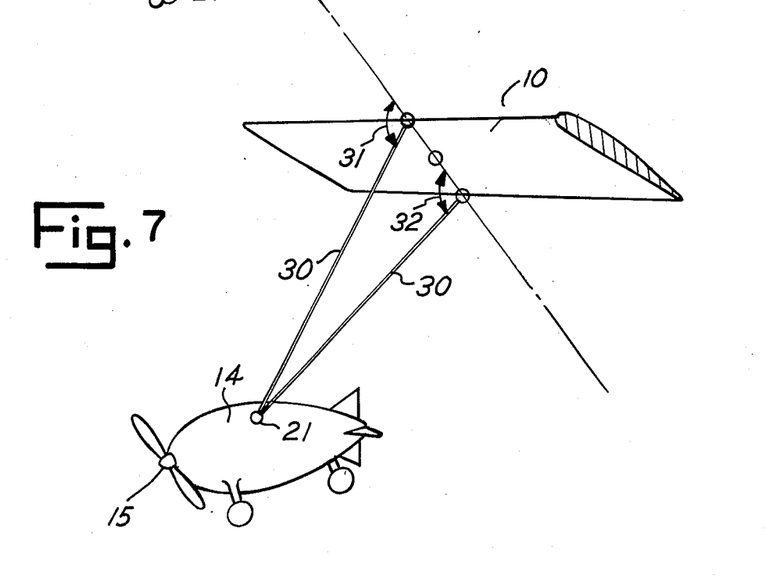
FIG. 7 is a perspective view illustrating a modified form for connecting the free wing to the fuselage.
Figure 8:
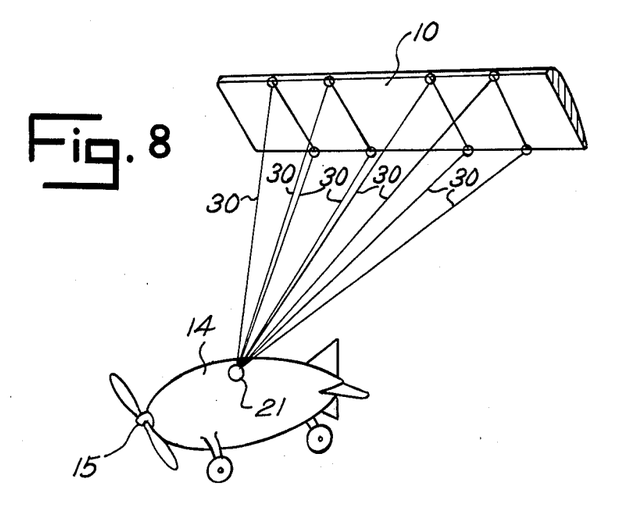
FIG. 8 is a perspective view illustrating additional modifications of the connection between the free wing and the fuselage.

A further advantage of this invention is that as shown in FIG. 7 and FIG. 8, the connection member 20 may be replaced with two or more lines 30 or cables 30. The length of the lines is calculated and fixed so as to produce the desired angle of relative pitch fore 31 and aft 32, thereby yielding the desired wing pitch angle 27. By controlling the length of the fore or aft lines in flight the wing trim angle of attack may be changed. The flight performance and control of the free wing flyer by using one line FIG. 1, or by using two lines FIG. 7, or by using multiple lines, FIG. 8, are the same as described in the preceding paragraphs.

Figure 9:
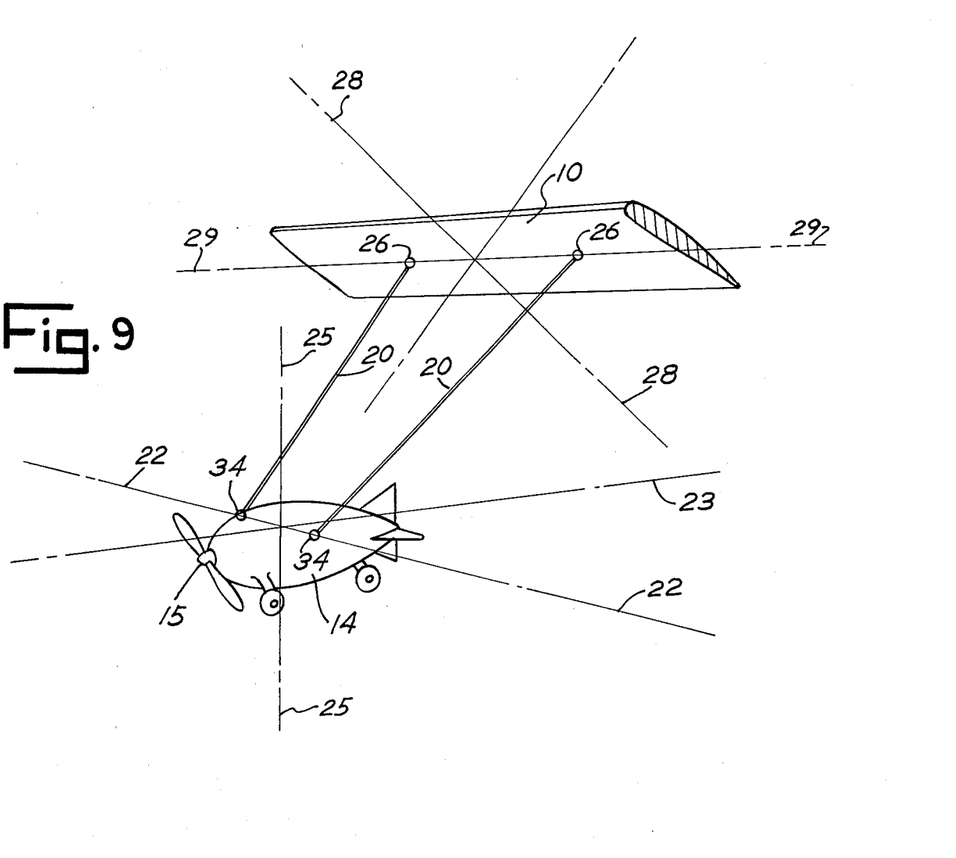
FIG. 9 is a perspective view showing another modification of the connection to the fuselage.
Figure 10:
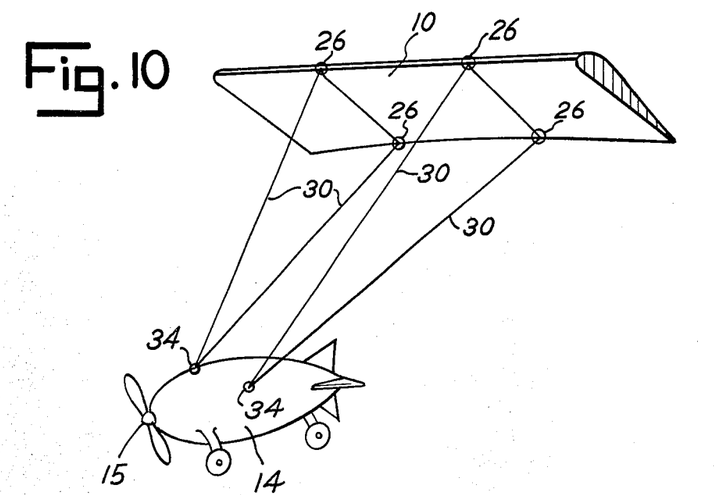
FIG. 10 is a perspective drawing illustrating additional modifications to the wing fuselage connection.
Figure 11:
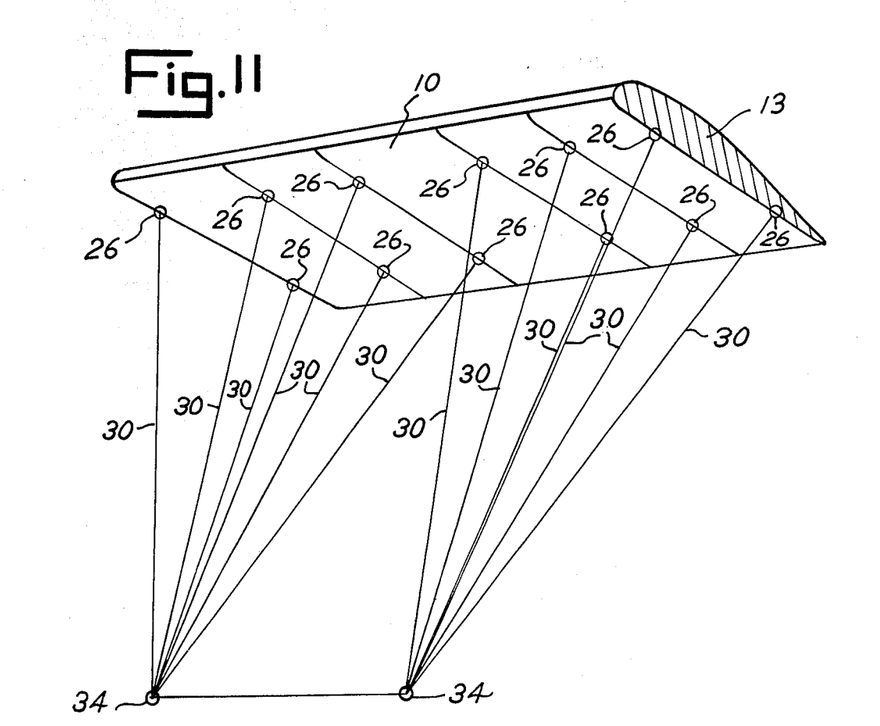
FIG. 11 is a perspective view of multiple connections between the free wing and the fuselage.

A further advantage of this invention is that the single attachment point 21 shown in FIGS. 1 through 8 can be changed to two attachment points 34 as illustrated in FIG. 9. Again the connecting members 20 may either be rigid or they may be non-rigid lines or cables. In addition, multiple connecting members 20 may be used as illustrated in FIG. 10 and FIG. 11.

Figure 12:
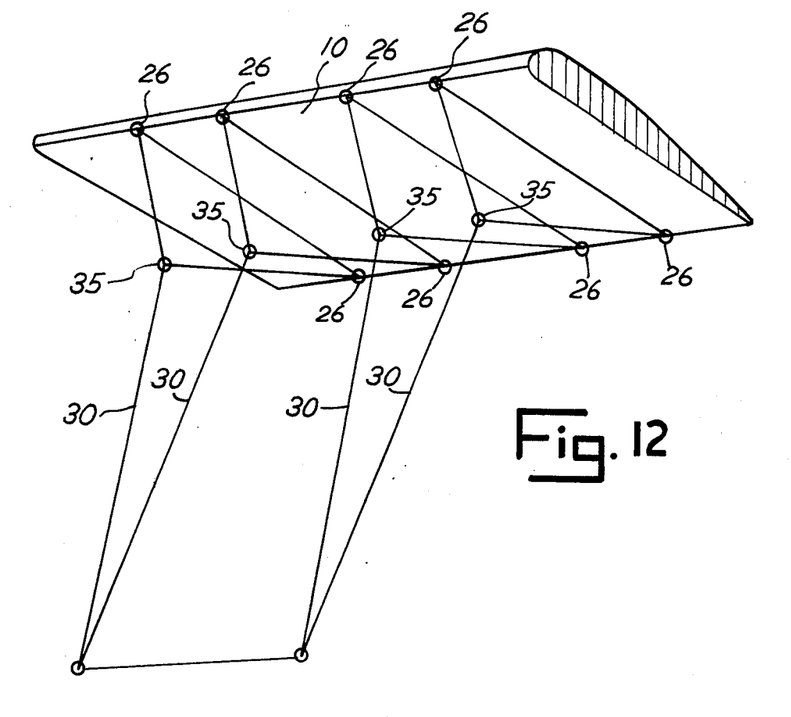
FIG. 12 is a perspective view of the modification in the connectors themselves.

It is not necessary that all of the connector members 20 extend down to attachment 34 or to attachment 21 as shown in FIG. 12. The junction point 35 of the connector members may be at any distance from the wing or fuselage.

Figure 13:
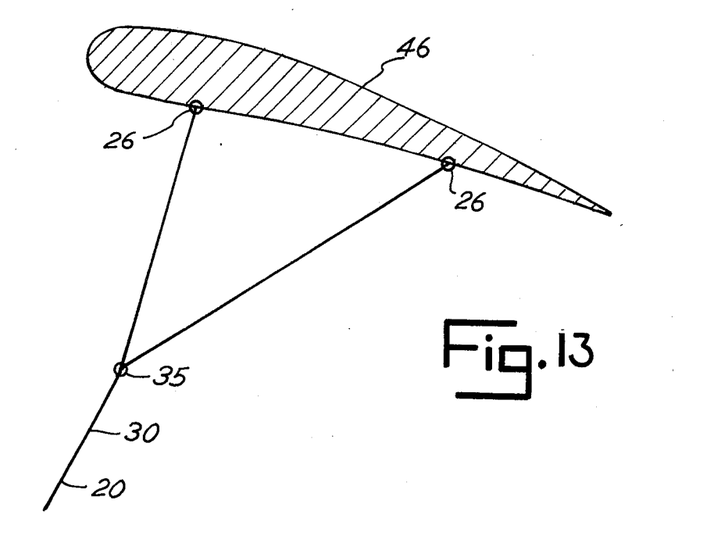
FIG. 13 is a side elevational view of a rigidized airfoil section.
Figure 14:
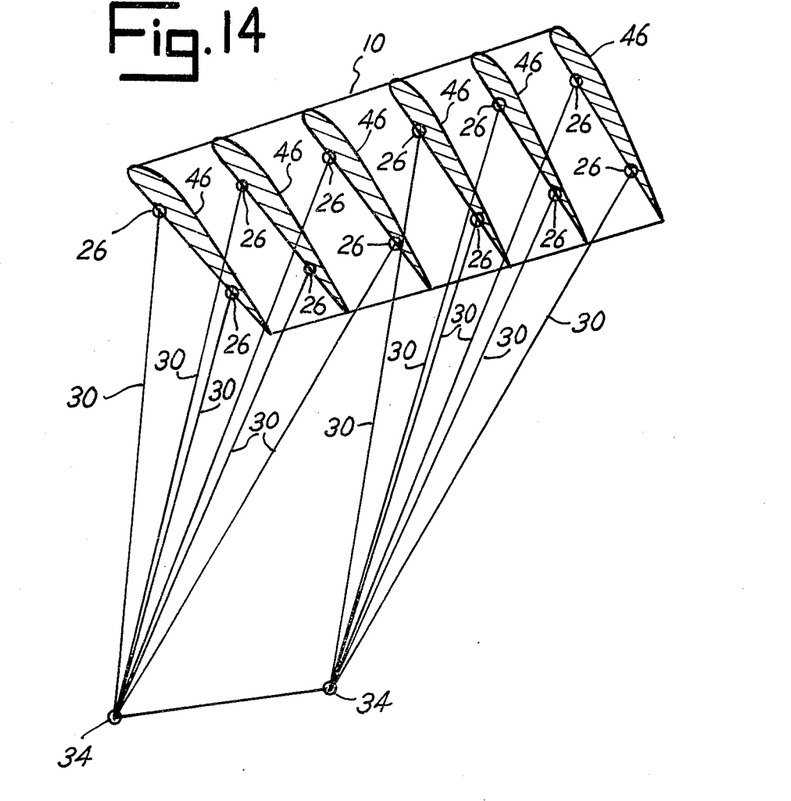
FIG. 14 is a perspective view illustrating the employment of the rigid airfoil sections of FIG. 13.
Figure 15:
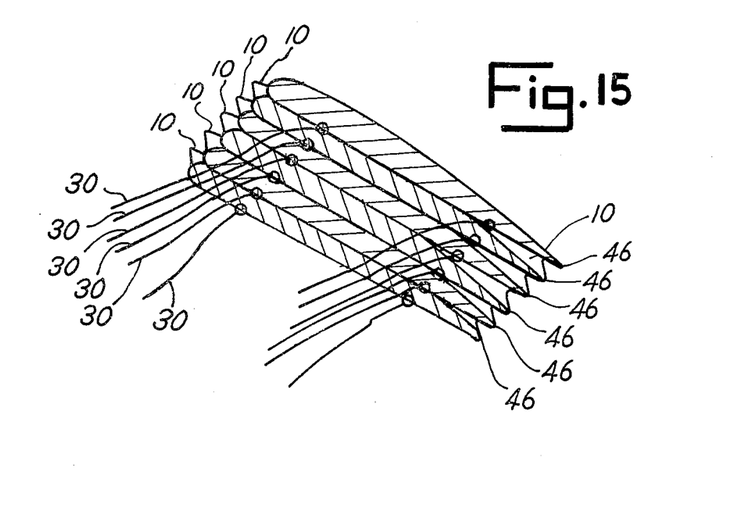
FIG. 15 is a perspective view of the wing folded.

A further advantage of the free wing flyer system is that the wing 10 itself need not be fully rigid in construction. For example, FIG. 13 illustrates a rigid airfoil section 46. If such multiple sections are used together with multiple lines as shown in FIG. 11, the remainder of the wing both top surface and bottom surface as well as leading edge may be constructed of semi-airtight or airtight fabric, FIG. 14. Such a wing, FIG. 14, is now semi-rigid and would in fact fold like an accordian as shown in FIG. 15. If such a wing is composed of airtight fabric, then the application of an internal pressure will restore the wing to its original rigid flight configuration even though the wing itself is constructed of semi-rigid materials. The required air pressure may be installed prior to flight from separate containers or it can be pumped directly through small lightweight hoses 36 from the fuselage to the wing as shown in FIG. 16.

Figures 16, 17:
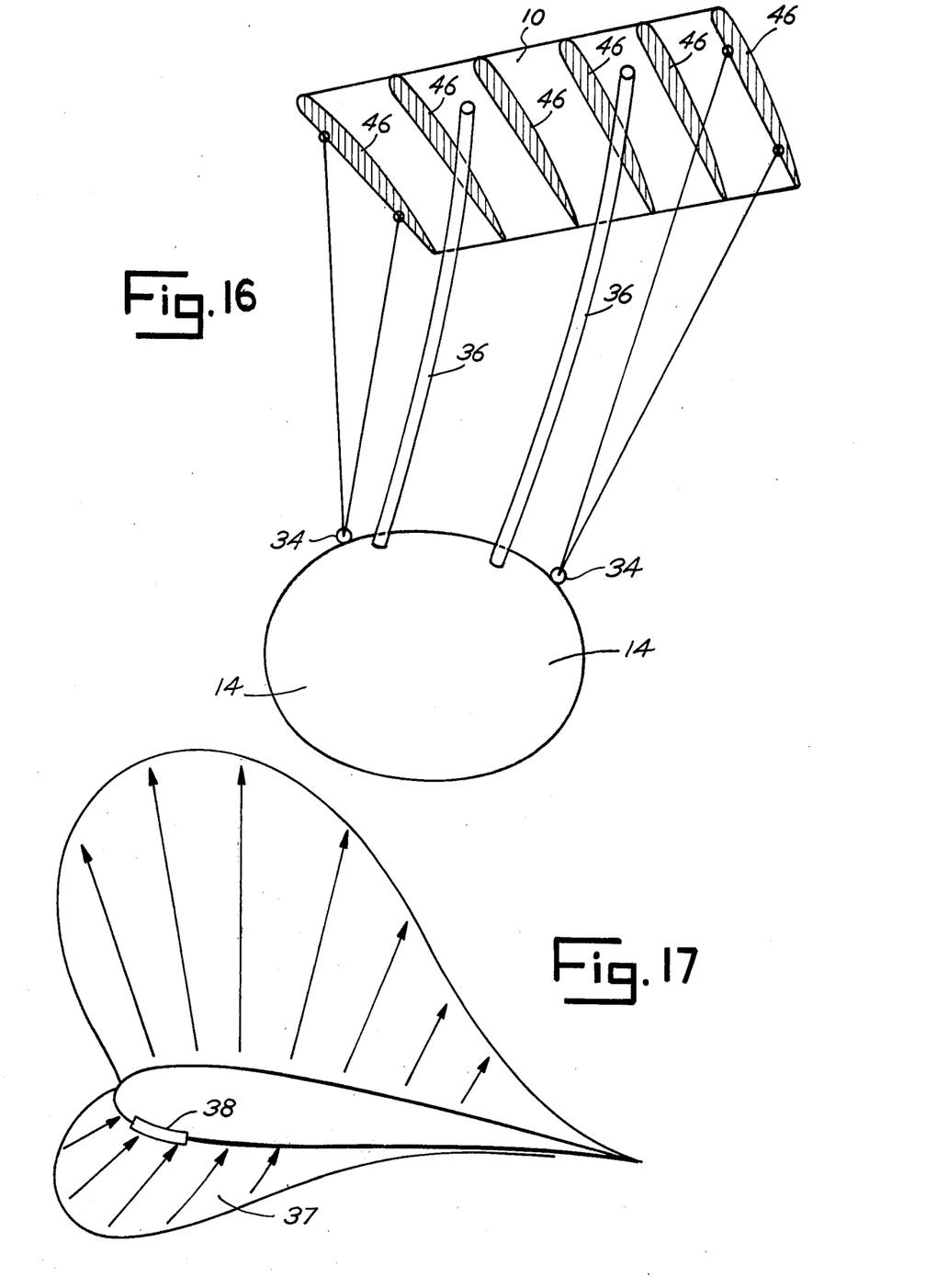
FIG. 16 is a perspective view illustrating pressurization hoses.
FIG. 17 is a side elevational view showing pressure distribution around an airfoil section and illustrating an alternate method of wing pressurization.

By its passage through the air the wing achieves a pressure distribution as illustrated in FIG. 17. By constructing the wing so as to allow the positive external pressures 37 on the forward lower surface to enter the wing openings 38 full wing pressurization may be achieved naturally.

Figure 18:
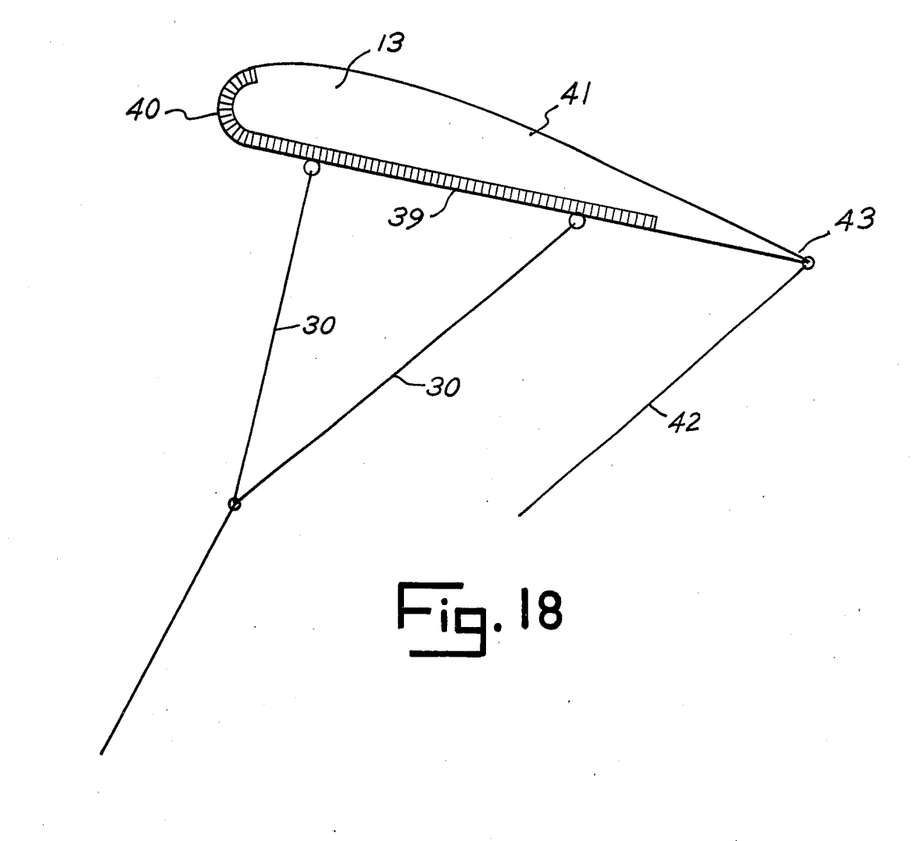
FIG. 18 is a side elevational view of the wing illustrating another concept for semi-rigidization.

Yet another way of de-rigidizing the construction of the wing is shown in FIG. 18 which illustrates an airfoil section whose bottom 39 and rounded leading edge 40 are rigidized in whole or in part; but the remainder is made of cloth 41. Again the remainder of the wing may be composed entirely of fabric which can be pressurized to achieve the flight configuration.

Thus, by utilizing a semi-rigid or non-rigid wing construction great reductions in wing weight and wing system moments of inertia are achieved, all of which greatly enhance free wing flyer flight performance, stability, and versatility.

FIG. 18 also shows a control line 42 which is attached to the cloth wing trailing edge 43. Since the trailing edge 43 is fabric it may be deflected in flight by the control line 42 so as to achieve ailerons 29 and/or flap 44 control.

It should be emphasized that since the free wing flyer can be entirely controlled by the wing, it is not necessary to have stabilizing fins in the horizontal 18 or vertical 17 plane on the fuselage 14. Also, it is not necessary to have rudder controls 26 or elevator controls 27 on the fuselage 14 (FIG. 5).

Figure 19:
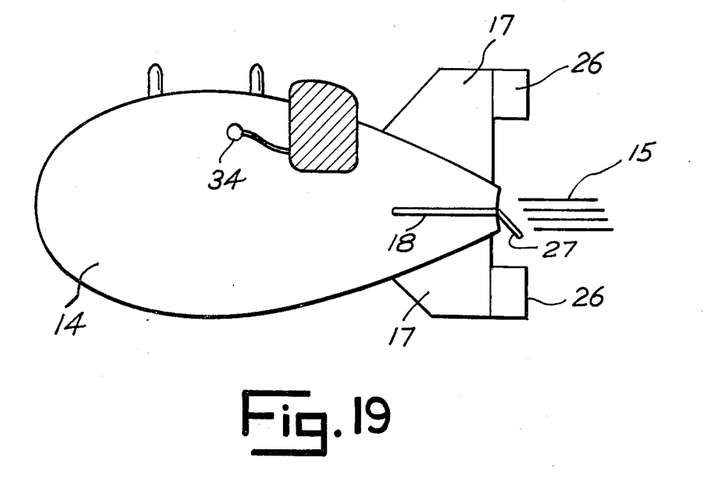
FIG. 19 is a perspective view of an air droppable or folded version of the invention.
Figure 20:
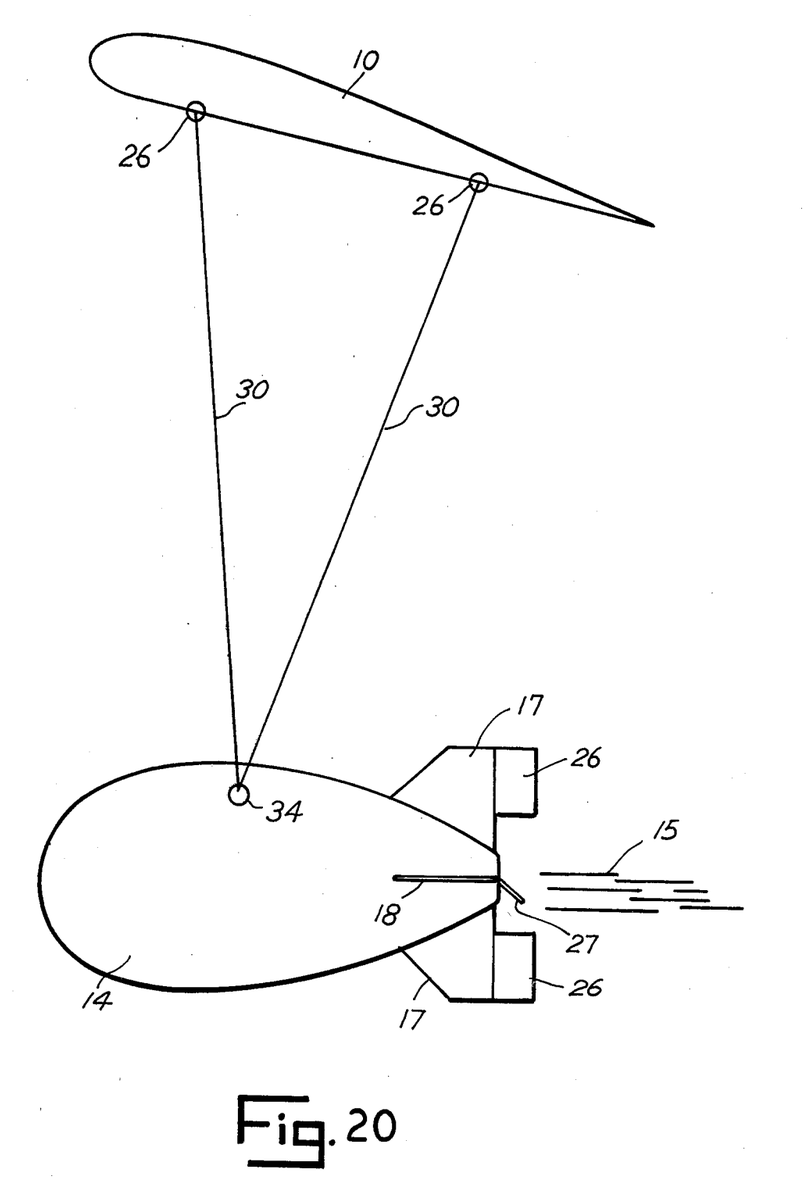
FIG. 20 is a perspective view of the droppable version in flight.

It is also noted that the completely flexible and/or semi-rigid wing allows the wing of the free wing flyer to be packed and stored. Thus the system may be air dropped and subsequently re-erected during free fall into the full flight system. Such a system is illustrated in FIGS. 19 and 20. Because of various missile requirements, it may not be necessary to use any landing gear system.

Figure 21:
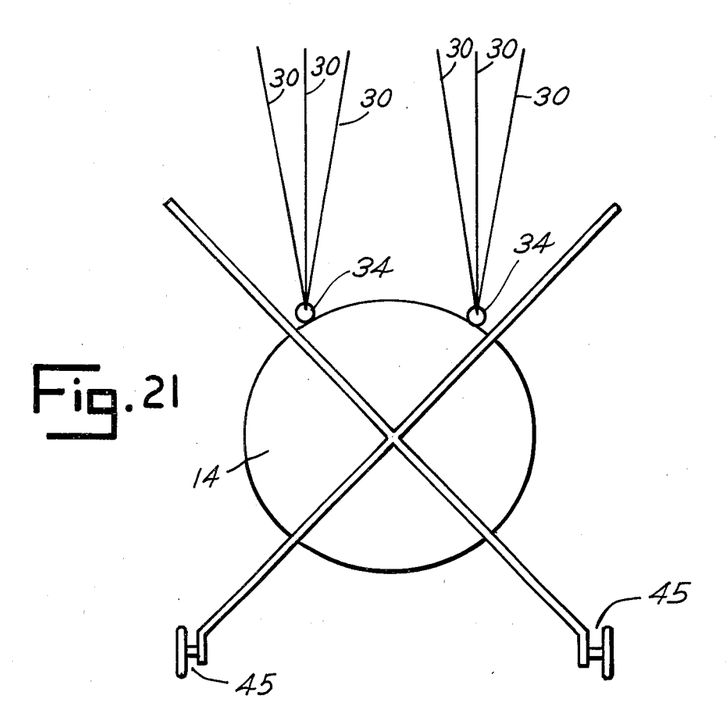
FIG. 21 is a front elevational view of the invention employing 45° stabilizers and landing gear.
Figure 22:
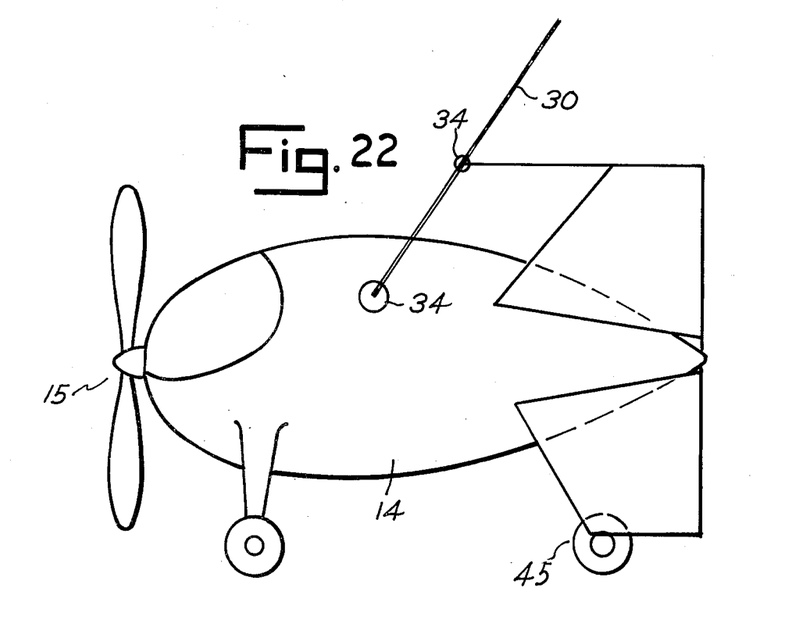
FIG. 22 is a side elevational view of FIG. 21.

It is further noted in FIGS. 21 and 22 that some system designs and weight advantages may be achieved by using fuselage stabilizing fins set at a 45° roll orientation as shown in FIG. 19. Such an arrangement provides more ground clearance, enables the rear landing wheels to be incorporated into the lower two fins and allows the attachment locations 34 to be connected to the fin structure.

Figure 23:
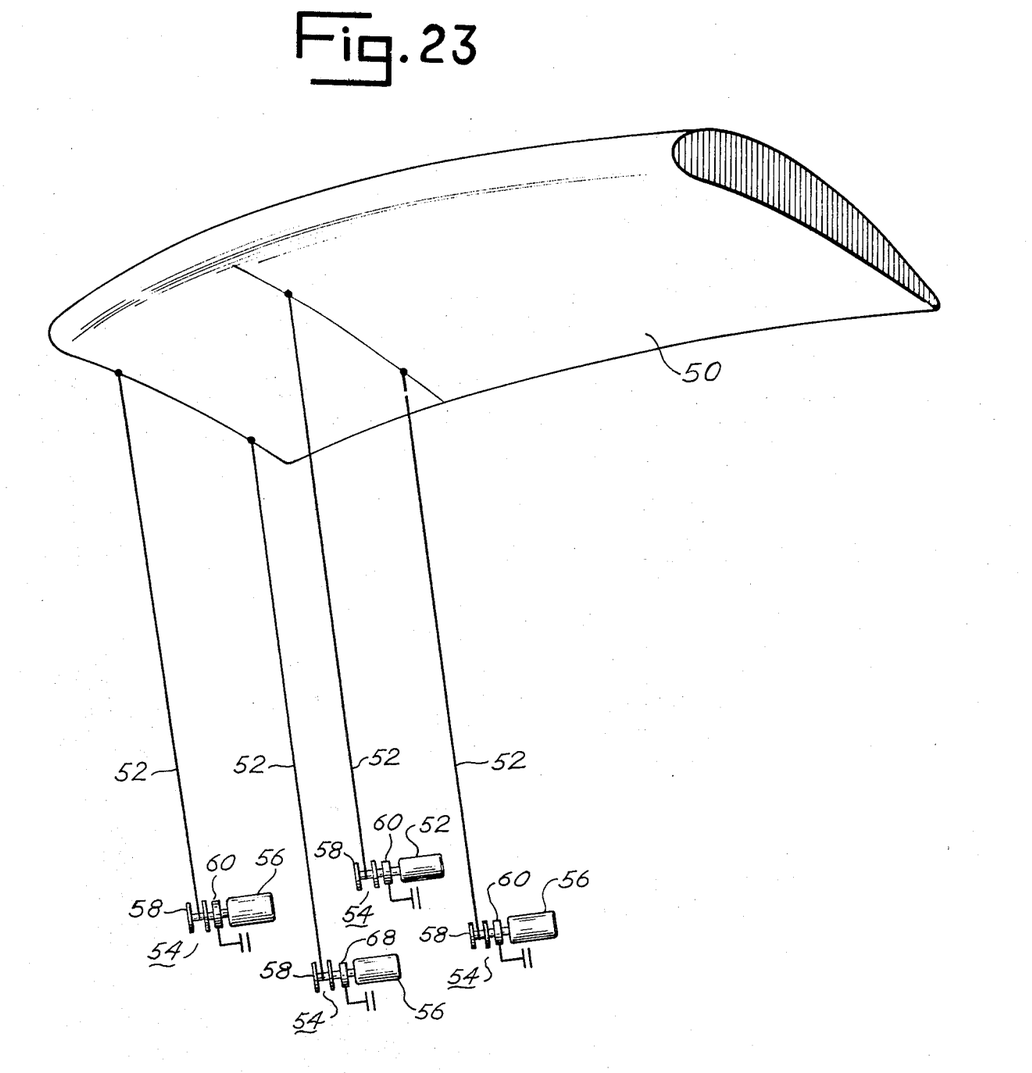
FIG. 23 is a fragmentary view of the present flying device, illustrating the mechanism for controlling the wing of the device.

As illustrated in FIG. 23, the wing 50, such as the semi-rigid wing or the completely non-rigid wing, may be flapped or otherwise controlled by reeling in or out the lines. Specifically, for example, each of the lines 52 as shown in the figure may be reeled by separate units 54 at different times, at different rates of pull, and at different distances. They may also be released at different times and at different rates. The reeling in and reeling out of the lines may be manually controlled or may be automatically controlled by a programmer involving the use of a computer which supplies the direction and the speed of the motor 56 and reel 58 of each unit illustrated in the drawing. The motor and reel may be operatively connected by a solenoid operated clutch 60. With the use of the motorized reels the instantaneous angle of attack, the downward thrust and the release of each of the air foil sections and adjacent ring area can be controlled at will so as best to divide the flapping action, and thus effect the best propulsion efficiency. Various other types of mechanisms for the reeling in and out of the line may be used, and some saving of weight can be achieved by using one motor and various reel diameters.

Various changes and modifications may be made in the free wing flyer; for example the wing may be constructed of very large size and filled with helium or hydrogen so as to provide buoyant lift for both the wing and fuselage. Also the fuselage may be such as to be partially filled with helium or hydrogen, thereby providing buoyant lift for the fuselage. In the normal forward flight mode substantial additional lift would be provided by the aerodynamic lift of the wing. Another example is the case of active connector lines 20, 30 which are attached to apparatus in the fuselage which moves in such a manner as to cause the semi-rigid or flexible wing to flap in a programmed way and thus to propel the vehicle like a bird through the air with great aerodynamic propulsion efficiency. Further, in the case of the semi-rigid or non-rigid wing, the wing area, platform, and airfoil section may be changed in flight so as to achieve greater flight efficiency in landing, in taking off and in cruising.

While only one embodiment and several modifications of that embodiment of the free wing flyer have been described in detail herein, various changes and modifications may be made without departing from the scope of this invention.

I claim:

1. A flying device comprising a fuselage, a wing having an upper layer and a lower layer spaced from said upper layer for producing substantially the sole lifting force of the device, a connection member, a means for attaching the wing to the connection member so that the wing is freely able to roll and yaw with respect to the connection member, a means whereby the angle of pitch between the wing and connection member may be held fixed or changed in flight, a pivot means for attaching the connection member to the fuselage such that the fuselage is freely able to pitch, yaw and roll with respect to the connection member, a means for moving the fuselage and the wing relative to one another in roll, pitch, yaw, surge, and swerve movements, a motor propulsion unit for propelling said fuselage and wing thhrough the air to lift, drive and maneuver said flyer, and a means whereby buoyant dynamic flight is achieved in air or underwater, consisting of inflation of the wing, said resulting buoyancy providing velocity which in turn provides dynamic lift on the wing and thus buoyant dynamic flight, positive or negative.

2. A flying device as defined in claim 1 in which said attachment means between the wing and the connection member consists of a 3-D bearing, permitting angular freedom in roll and yaw.

3. A flying device as defined in claim 1 in which said attachment means between the wing and the connection member consists of a 3-D bearing having constraint and control in pitch.

4. A flying device as defined in claim 1 in which a means whereby the device is controlled by the mass of the fuselage, is included for controlling of the forward and aft movement of the flyer system center of gravity to achieve pitch up or pitch down, including transverse movement of the center of gravity to achieve right turn or left turn.

5. A flying device as defined in claim 1 in which a means whereby the device is controlled by the propulsion line of action in the fuselage, is included for controlling tilting the thrust line up or down to achieve climb or sink, including tilting the thrust line left or right to achieve right or left turn.

6. A flying device as defined in claim 1 in which the device has two suspension points on the fuselage and a means controls the movement of both suspension points up or down to achieve pitch up or pitch down.

7. A flying device as defined in claim 1 in which a means whereby the wing may be self erecting is included, consisting in using an external pressure source, using the natural negative aerodynamic pressure on the top of the wing, and the natural positive aerodynamic pressures at the front and/or the bottom of the wing.

* * * * *